United States Patent [19]

Chiang et al.

[11] 4,311,681

[45] Jan. 19, 1982

[54] METHOD OF REGENERATING PHOSPHORIC ACID EXTRACTION SOLVENT

[75] Inventors: John S. C. Chiang, Mercerville; William S. Moore, Princeton Junction, both of N.J.

[73] Assignee: FMC Corporation, Philadelphia, Pa.

[21] Appl. No.: 150,866

[22] Filed: May 19, 1980

[51] Int. Cl.³ .............................................. C01B 25/16
[52] U.S. Cl. ................................................. 423/321 S
[58] Field of Search .................... 423/319, 320, 321 S, 423/321 R

[56] References Cited

U.S. PATENT DOCUMENTS

| | | | |
|---|---|---|---|
| 1,929,441 | 10/1933 | Milligan | 423/321 S |
| 1,929,442 | 10/1933 | Milligan | 423/321 S |
| 1,929,443 | 10/1933 | Milligan | 423/321 S |
| 2,163,100 | 7/1939 | Hettrick | 23/165 |
| 2,917,367 | 12/1959 | Hodges et al. | 23/165 |
| 2,962,357 | 11/1960 | Williams | 23/165 |
| 3,072,461 | 1/1963 | Long et al. | 23/165 |
| 3,124,419 | 3/1964 | Germain et al. | 12/165 |
| 3,298,782 | 1/1967 | Archambault | 23/165 |
| 3,366,448 | 1/1968 | Martin et al. | 23/165 |
| 3,379,501 | 4/1968 | Treitler et al. | 23/165 |
| 3,397,955 | 8/1968 | Champ et al. | 23/165 |
| 3,410,656 | 11/1968 | Bunin et al. | 423/321 S |
| 3,433,592 | 3/1969 | Baniel et al. | 23/165 |
| 3,707,357 | 12/1972 | Chiang | 23/312 P |
| 3,764,655 | 10/1973 | Ehlers et al. | 423/309 |
| 3,767,769 | 10/1973 | Winand et al. | 423/309 |
| 3,819,810 | 6/1974 | Goldstein | 423/321 |
| 3,840,639 | 10/1974 | Drechsel | 423/167 |
| 3,872,215 | 3/1975 | Cherdron et al. | 423/309 |
| 3,919,396 | 11/1975 | Toshimitsu et al. | 423/321 |
| 3,920,797 | 11/1975 | Toshimitsu et al. | 423/321 |
| 3,943,204 | 3/1976 | Martin et al. | 260/990 |
| 3,956,465 | 5/1976 | Amanrich et al. | 423/321 |
| 3,964,994 | 6/1976 | Kelly | 208/196 |
| 3,970,741 | 7/1976 | Pavonet et al. | 423/321 S |
| 3,972,982 | 8/1976 | Centofanti | 423/321 S |
| 3,993,736 | 11/1976 | Irani | 423/321 S |
| 4,018,869 | 4/1977 | Beltz et al. | 423/321 S |
| 4,044,108 | 8/1977 | Kikuchi et al. | 423/321 R |
| 4,065,547 | 12/1977 | Leroy et al. | 423/321 S |
| 4,117,092 | 8/1978 | Beltz et al. | 423/321 S |
| 4,118,462 | 10/1978 | Desire et al. | 423/321 S |
| 4,132,540 | 1/1979 | Edwards et al. | 71/34 |

FOREIGN PATENT DOCUMENTS

| | | |
|---|---|---|
| 2278628 | 2/1969 | France . |
| 1127247 | 9/1968 | United Kingdom . |
| 1509576 | 5/1978 | United Kingdom . |

*Primary Examiner*—O. R. Vertiz
*Assistant Examiner*—Gregory A. Heller
*Attorney, Agent, or Firm*—George F. Mueller; Frank Ianno

[57] ABSTRACT

Organic phosphate solvents used in the extraction of phosphoric acid from impure phosphoric acid solutions, and from which the phosphoric acid has been stripped, are washed with an aqueous alkali orthophosphate solution to remove impurities, particularly silica, fluorine and organic impurities, from the solvent prior to re-use.

15 Claims, No Drawings

METHOD OF REGENERATING PHOSPHORIC ACID EXTRACTION SOLVENT

This invention relates to the use of organic phosphate solvents to extract phosphoric acid from impure phosphoric acid solutions, and more particularly relates to the purification of the organic phosphate solvents for re-use.

The major sources of phosphate values are mineral deposits of fluorapatite, $Ca_5(PO_4)_3F$, often referred to as phophate rock. These phosphate values are recovered commercially by two basic processes: the electrothermal process, and the wet process.

The electrothermal process involves the high temperature reduction of phosphate rock using large quantities of electricity to produce elemental phosphorus. The elemental phosphorus is subsequently oxidized and hydrated to produce phosphoric acid.

The phosphoric acid produced by this process is of high purity and is suitable for most uses with little or no treatment. The major disadvantage of the electrothermal process is the high cost of electricity.

The wet process, with which the present invention is concerned, involves the digestion of phosphate rock using a strong acid, such as hydrochloric, nitric or more commonly, sulfuric acid, to convert the mineral phosphate to crude phosphoric acid. This reaction, with sulfuric acid, is often represented as follows:

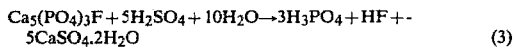

$$Ca_5(PO_4)_3F + 5H_2SO_4 + 10H_2O \rightarrow 3H_3PO_4 + HF + 5CaSO_4 \cdot 2H_2O \quad (3)$$

Unlike the electrothermal process, the acid produced by the wet process contains significant amounts of dissolved impurities including arsenic, aluminum, magnesium, iron, fluorine, silica and various organic compounds. Because of these impurities, this acid is only useful, without further treatment, in fertilizer applications. For other applications, however, the acid must be purified in some manner.

One common method for the purification of phosphoric acid produced by the wet process, this acid often being called wet acid, is solvent extraction of the wet acid from the acidulated rock solution, followed by stripping and recovery of the wet acid from the solvent using water or purified aqueous phosphoric acid as the stripping agent.

Various solvents have been suggested for the extraction of wet acid from the acidulated rock solution, including $C_3$ to $C_8$ aliphatic alcohols, esters, ketones or aldehydes (U.S. Pat. Nos. 1,838,431; 1,857,470; 1,929,441; 1,929,442 and 1,929,443); and substantially water immiscible alkyl phosphates, aryl phosphates or alkyl aryl phosphates (U.S. Pat. No. 3,410,656).

These alkyl, aryl, and alkyl aryl phosphates, hereinafter called organic phosphates, have received a significant amount of attention on a commercial basis. Tributylphosphate has proven to be one of the more particularly useful members of this class of compounds.

Long et al, in U.S. Pat. No. 3,072,461 issued on Jan. 8, 1963, disclose the use of substantially water immiscible trialkyl phosphates to extract phosphoric acid from a solution produced by the hydrochloric acid digestion of phosphate rock. Tributylphosphate is disclosed as the preferred solvent.

Bunin et al, in U.S. Pat. No. 3,410,656 issued on Nov. 12, 1968, disclose the use of substantially water immiscible alkyl phosphates, aryl phosphates and alkyl aryl phosphates diluted with a substantially water immiscible organic solvent to extract phosphoric acid from a solution produced by the sulfuric acid digestion of phosphate rock. Tributylphosphate is disclosed as one useful member of this class of organic phosphates.

In any of these extraction proccesses for wet acid, the preferred mode of operation includes the continued recycling of the solvent through the system. It is generally recognized, however, that the solvent, after being repeatedly used for extraction and stripping in this manner, may accumulate high levels of organic and inorganic contaminants which may originate from either the impure acid or from decomposition of the solvent.

It is known that organic phosphate solvents accumulate, among other contaminants, high levels of silicon, fluorine and organic impurities. The silicon compounds, including silica and polysilicic acids, and the fluorine compounds, including fluosilicic acid, originate from the acidulated rock solution. The organic impurities may originate from either the acidulated rock solution (fatty acids, amines, antifoaming agents and the like) or from the decomposition of the organic phosphate solvent (dibutylphosphate, monobutyl phosphate, butyl alcohol, and the like when tributylphosphate is used as the solvent).

High levels of these impurities dissolved in the organic phosphates create a myriad of processing problems. The silicon compounds form a gelatinous sludge thereby plugging the process equipment. The presence of fluorine compounds results in high levels of fluorine in the product acid. The organic impurities produce interfacial layers and emulsions thereby causing poor solvent-aqueous phase separation in the extraction and stripping operations. These problems result in lower throughput, impure product acid, and frequent shutdown for cleaning up the sludge deposited on the equipment and eliminating the interfacial layers.

A common technique for regenerating many organic solvents involves the use of an aqueous wash to eliminate accumulated impurities. Such techniques have been used for removing impurities from the organic phosphate solvents used in the wet acid process. U.S. Pat. No. 3,607,029 issued Sept. 21, 1971 to Jean R. Goret et al, describes the regeneration of stripped tributylphosphate by washing the solvent with 0.5 N (2%) caustic. Apparently the caustic neutralizes the impurities forming sodium containing solids, such as sodium silicates, and water soluble sodium salts. The neutralized impurities are separated from the organic phosphate using for example, conventional liquid-liquid phase separation followed by filtration.

The caustic regeneration of the organic phosphates is, however, limited, particularly when the impurity levels are high. Apparently, the high alkalinity of the caustic causes saponification, that is, a reaction between the hydroxide ions and the fatty acids coming from the acidulated rock solution, thereby producing troublesome soapy materials. These soapy materials cause the fine, solid sodium silicates to be suspended in the solvent phase. Complete separation of large quantities of soapy materials and the suspended fine solids from the washed solvent by filtration is therefore difficult if not impossible.

U.S. Pat. No. 3,767,769, issued Oct. 23, 1973, to Winand, et al, describes the regeneration of stripped tributylphosphate by washing the solvent with 0.5 N (2%) caustic followed by washing with 0.5 N nitric acid.

Apparently the nitric acid neutralizes the soapy material and coagulates the suspended solids which result from the caustic washing. The coagulated materials settle slowly to the solvent-aqueous interface and the washed solvent is recovered by discarding the interfacial layer along with the used aqueous nitric acid.

Unfortunately, the nitric acid wash following the caustic wash creates new difficulties. The nitric acid can be extracted into the organic phosphate solvent thereby contaminating it. The nitric acid may also cause decomposition of the organic phosphate. For example, tributylphosphate decomposition may form n-butyl nitrate which is an emulsifying agent. In addition, the interfacial layer of coagulated materials contains a fair amount of solvent, which, when discarded with the used nitric acid, adds further operating costs to the process.

To compensate for the imperfection of the caustic washing step, followed in some cases by nitric acid neutralization, the wet acid has sometimes been pretreated to remove the impurities which may find their way into the solvent. Canadian Pat. No. 773,036, issued Dec. 5, 1967 to Champ et al, discloses the use of boric acid to precipitate the silicon compounds in the wet acid prior to the extraction using organic phosphates. Winand et al, supra, and Bunin et al, supra, suggests the use of sodium carbonate to remove the fluorine compounds prior to the organic phosphate extraction. U.S. Pat. No. 3,872,215, issued Mar. 18, 1975, to Cherdron et al, discloses the use of activated carbon or a water immiscible organic solvent, such as kerosene, benzene, or xylene, to remove the organic impurities prior to the extraction step. Such extensive pretreatment of the wet acid significantly complicates the process and adds further costs to the production operation.

According to the present invention, in a process of washing a substantially water immiscible solvent with an aqueous solution to separate impurities from the solvent, the solvent being selected from the group consisting of alkyl phosphates, aryl phosphates, and alkyl aryl phosphates, which solvent has been used to extract phosphoric acid from an impure phosphoric acid solution and from which the phosphoric acid has been stripped, an improvement has been discovered which comprises conducting the washing with an aqueous alkali orthophosphate sufficient to maintain the pH of the solvent-aqueous mixture at from about 9.5 to about 12.5. The invention is thus applicable to the purification of any organic phosphate solvent used for such extraction of phosphoric acid.

In carrying out the present invention, an impure organic phosphate solvent, which has been thus used to extract phosphoric acid from an impure phosphoric acid solution, and from which the phosphoric acid has been stripped, is purified by washing the solvent with an aqueous alkali orthophosphate solution. Washing the solvent in this manner effectively removes most of the impurities from the solvent. In particular, the silicon, fluorine and organic impurities are effectively removed.

The organic phosphate solvents used for phosphoric acid extraction are substantially immiscible with water. The most suitable solvents for that purpose have been those selected from the alkyl phosphates, the aryl phosphates, and the alkyl aryl phosphates. Examples of the alkyl phosphates are tributylphosphate, triethylphosphate, diethylhexylphosphate, trioctylphosphate and ethyl dibutylphosphate. In addition, certain alkoxy substituted alkyl phosphates, such as tributoxyethylphosphate, can be used for phosphoric acid extraction and are included in the term "alkyl phosphate". Examples of the aryl phosphates are tricresylphosphate, dicresylxylylphosphate and cresyldiphenylphosphate. The preferred phosphate is tributylphosphate.

The invention is also applicable to the purification of organic phosphate solvents used for phosphoric acid extraction together with an organic diluent which is substantially water immiscible. This organic diluent improves phase separation after the phosphoric acid extraction step and also facilitates the extraction itself by lowering the viscosity and the density of the organic extraction phase. Such diluents include benzene, toluene, xylene, monochlorobenzene, o-dichlorobenzene, decahydronaphthalene, low boiling petroleum hydrocarbons such as petroleum naphtha, kerosene, and saturated aliphatic hydrocarbons such as N-hexane. The volume ratio of organic phosphate to diluent may be from about 10:1 to about 0.5:1 with a ratio of about 3:1 being preferred.

The aqueous alkali orthophosphate solution neutralizes the impurities in the solvent by forming alkali containing solid compounds and water soluble salts. Some of the orthophosphate values co-precipitate with the solid alkali compounds thereby forming a high density solid mixture which settles in the aqueous phase rather than at the solvent-aqueous interface as occurs with the nitric acid neutralization of the prior art. This settling of the solids into the aqueous phase permits an easy separation of the solvent, the aqueous and the solids from each other.

The alkalinity of the solvent-aqueous mixture controls the washing operation. The pH of this mixture must not be too high or soapy material will form. In addition, the pH must not be low because alkali neutralization and orthophosphate co-precipitation are pH dependent. A balancing of these factors is achieved when the pH of the solvent-aqueous mixture during the washing operation is from about 9.5 to about 12.5, and preferably from about 10 to about 12. The presence of suitable amounts of the alkali and the orthophosphate provides the proper pH for the solvent-aqueous mixture during washing.

A suitable aqueous solution for the washing operation can be prepared in a number of ways. An alkali hydroxide and an orthophosphate can each be added separately to the solvent, along with water, in amounts sufficient to maintain the pH of the resulting solvent-aqueous mixture within the proper range. The alkali hydroxide and the orthophosphate can also be pre-mixed with water in amounts such that when added to the solvent for the washing step, the resulting solvent-aqueous mixture will be within the proper pH range. Such a pre-mixed aqueous alkali orthophosphate solution has a pH of from about 11.5 to about 13.7 and a specific gravity of from about 1.07 to about 1.12 as measured at room temperature. These conditions define an aqueous solution containing at least about 2 weight percent orthophosphate, measured as $P_2O_5$, and having a mole ratio of alkali to phosphorus of from about 2.5:1 to about 3.5:1.

The preferred pre-mixed aqueous alkali orthophosphate solution has a pH of from about 12 to about 13.2 and a specific gravity of from about 1.08 to about 1.11 as measured at room temperature. These preferred conditions define an aqueous solution containing from about 3 to about 4 weight percent $P_2O_5$ and having a mole ratio of alkali to phosphorus of from about 2.7:1 to about 3.2:1.

Since the solvent has been used to extract phosphoric acid from an impure phosphoric acid solution, it is preferred that at least some, and more preferably all of the orthophosphate needed for the washing step may be left behind with the solvent, rather than be stripped out with the bulk of the phosphoric acid, and so be present for the washing operation.

The alkali values for the washing step are preferably supplied as sodium or potassium, although any of the alkali metals are suitable. The orthophosphate values are preferably supplied by phosphoric acid, although any material capable of providing orthophosphate in solution, such as the polyphosphoric acids, is suitable. Materials such as trisodium phosphate and solutions of these can be used to supply both the alkali and the orthophosphate.

A suitable volume ratio of solvent to aqueous is from about 1:1 to about 4:1, with the preferred ratio being from about 2:1 to about 3:1. A solvent to aqueous volume ratio below about 1:1 will produce the desired results, but the use of such large aqueous volumes is unnecessary and uneconomical. A solvent to aqueous volume ratio greater than about 4:1 is useful, but may not have adequate alkali and orthophosphate values to neutralize and co-precipitate all of the impurities in the solvent; and even if there are sufficient alkali and orthophosphate values, the volume of precipitated solids may be too large relative to the volume of aqueous to allow easy separation.

The washing temperature may be varied from about 10° C. to about 90° C., with a preferred range of from about 20° C. to about 50° C. The high washing temperatures provide for more complete purification of the solvent. Maximum temperatures should, however, be limited to about 90° C. to avoid excessive solvent decomposition.

After washing the solvent with the aqueous alkali orthophosphate solution, the resulting solvent-aqueous-solids mixture can be separated by conventional liquid-liquid and liquid-solid separation techniques, including gravity settling and centrifugation. Centrifugation is the preferred technnique because it requires less operating time.

After recovering the washed solvent, the solvent is preferably further purified by treating it with activated carbon to remove residues and soapy materials which may be present. A treatment ratio of about 0.25 parts by weight of activated carbon to about 100 parts by weight of washed solvent is suitable.

The entire wet acid production and purification process, including the solvent washing of the present invention, is preferably operated on a continuous or a semi-continuous basis. In addition, an economical operation requires that the solvent be continuously recycled after the washing operation for further extraction and stripping of phosphoric acid. Washing the solvent by the means of the present invention prior to recycling it provides a simple means of removing troublesome impurities from the solvent, thereby promoting a smooth wet acid production and purification process.

To conserve alkali orthophosphate values, part of the used aqueous alkali orthophosphate solution may be recycled for use again in the washing operation. The amount of used alkali orthophosphate solution that can be recycled depends on the amount of impurities in the solution. High levels of impurites in the recyled aqueous solution will reduce the effectiveness of the washing. Recycling from about 75 to about 95 weight percent of the used alkali orthophosphate solution will usually provide acceptable removal of impurities from the solvent during washing. The recycled alkali orthophosphate solution need only be supplemented in the washing operation such that the solvent-aqueous mixture contains the proper amount of alkali and orthophosphate to maintain the pH of the mixture.

Washing the solvent with fresh aqueous alkali orthophosphate solution is effective in removing over 90 weight percent of the silicon and fluorine impurities, and from about 500 to about 6000 ppm by weight organic impurities as total organic carbon (TOC). The recycled washing solution removes slightly less, about 85 weight percent of the silicon impurities, but similar amounts of fluorine and organic impurities. The high efficiency achieved when recycling the alkali orthophosphate solution makes it necessary to wash only a small portion of solvent when the solvent itself is being recycled for further extraction and stripping of phosphoric acid. Washing of only up to about 5 weight percent of the stripped solvent will maintain low enough impurity levels in the solvent to avoid operating problems. Such recycling of both the solvent and the aqueous is the preferred mode of operation. Preferably, the solvent to be washed, that is, the solvent which has been separated from the recycle solvent stream, can be stored until a batch of it is ready for washing. This batch can then be fed continuously to the washing operation. Such a semi-continous washing operation provides economy of operation since, for example, one plant shift (approximately 8 hours) could be used to wash all of the contaminated solvent generated over a 24 hour period.

EXAMPLE I

This example demonstrates the regeneration of an impure tributylphosphate-kerosene solvent after a purified wet process phosphoric acid has been stripped out. This impure solvent is hereinafter referred to as stripped solvent.

About 200 grams of the stripped solvent were washed with 100 grams of an aqueous sodium orthophosphate solution containing 4 weight percent $P_2O_5$ and having an Na:P mole ratio of 3:1. Washing was carried out by shaking a mixture of the solvent and the aqueous in a 500 ml separatory funnel for one minute at room temperature. The resulting mixture was centrifuged at 2000 rpm for 15 minutes, which resulted in the separation of the solvent, the aqueous, and the solid phases. These were readily isolated by decantation and filtration.

About 20 grams of the isolated washed solvent were additionally treated with 0.05 grams of an activated carbon, and filtered through a 0.75 to 1.5 micron glass fiber filter.

The unwashed solvent and the washed solvent (before and after activated carbon treatment) were analyzed for $P_2O_5$, $SiO_2$ and fluorine values. The results are as follows:

|  | Solvent Before Washing | Solvent After Washing | Solvent After Washing & Activated Carbon Treatment | Removal % |
| --- | --- | --- | --- | --- |
| $P_2O_5$, % | 0.40 | 0.01 | 0.01 | — |
| $SiO_2$, ppm | 5900 | 322 | 41 | 99.3 |
| F, ppm | 529 | 3 | 1 | 99.8 |

This data shows excellent removal of the silicon and fluorine containing impurities upon washing with the aqueous sodium orthophosphate solution. These results are improved even further by additional treatment with activated carbon. (Note that the residual $P_2O_5$ values in the solvent before washing can contribute to the $P_2O_5$ values necessary for the aqueous alkali orthophosphate washings.)

The isolated aqueous phase and the dried solid phase (weighing about 100 grams and 2.5 grams respectively) were similarly analyzed for $P_2O_5$, $SiO_2$ and fluorine values. They were additionally analyzed for total organic carbon. The results are as follows:

|  | Aqueous | Solid |
|---|---|---|
| $P_2O_5$, % | 5.0 | 11.8 |
| $SiO_2$, % | 0.56 | 32.5 |
| F, ppm | 780 | 2962 |
| TOC, ppm | 3640 | 2100 |

By material balance calculations, it was found that about 1800 ppm of organic impurities, expressed as total organic carbon (TOC), were removed from the solvent into the aqueous and the solid phases.

EXAMPLE II

The solvent regeneration procedure employed in this example is the same as that of Example I except that an aqueous potassium (instead of sodium) orthophosphate washing solution was used. The washing solution contained about 4% $P_2O_5$ and had a K:P mole ratio of 3:1.

After the washing operation, the solvent, the aqueous, and the solid phases were isolated as in Example I. About 20 grams of the isolated washed solvent were additionaly treated with activated carbon as in Example I.

The unwashed solvent and the washed solvent (before and after activated carbon treatment) were analyzed for $P_2O_5$, $SiO_2$ and fluorine values. The results are as follows:

|  | Solvent Before Washing | Solvent After Washing | Solvent After Washing & Activated Carbon Treatment | Removal, % |
|---|---|---|---|---|
| $P_2O_5$, % | 0.40 | 0.01 | 0.01 | — |
| $SiO_2$, ppm | 5900 | 290 | 65 | 98.9 |
| F, ppm | 529 | 2 | 1 | 99.8 |

This data shows excellent removal of the silicon and fluorine containing impurities upon washing with the aqueous potassium orthophosphate solution, which is further improved by additional treatment with activated carbon.

The isolated aqueous phase and the dried solid phase (weighing about 100 grams and 2 grams respectively) were analyzed for TOC and were found to contain about 2800 ppm and 60,000 ppm respectively.

By material balance calculations, it was found that about 2000 ppm of organic impurities, expressed as TOC, were removed from the solvent into the aqueous and solid phases.

EXAMPLE III

This example demonstrates the use of a repeatedly reformulated alkali orthophosphate washing solution in regenerating an impure stripped tributylphosphate-kerosene solvent.

Initially, about 300 grams of the stripped solvent were washed with about 150 grams of an aqueous sodium orthophosphate solution containing about 3% $P_2O_5$ and having an Na-P mole ratio of 3.5 to 1 and a pH of 13.7. Washing was carried out by shaking the mixed solvent and aqueous in a 500 ml separatory funnel for one minute at a temperature of 19°–25° C. The resulting mixture was centrifuged at 3000 rpm for 15 minutes thereby separating the solvent, the aqueous and the solid phases, which were then isolated as in Example I.

About 125 grams (83%) of the isolated aqueous phase, that is, the used washing solution, were reformulated by addition of a sufficient amount of a 25% sodium hydroxide solution and water to provide a pH of 13.5 and a specific gravity of 1.09 to 1.11. The final weight of the reformulated washing solution was 150 grams.

This reformulated washing solution was then used to wash another 300 grams of stripped solvent and again, about 83% of the isolated used washing solution was reformulated, all as described above.

This procedure of washing stripped solvent with reformulated washing solution was repeated four more times, giving a total of five washing cycles with reformulated washing solutions. The isolated solvent, after each washing cycle, was analyzed for $P_2O_5$, $SiO_2$ and fluorine. The results are as follows:

|  | Solvent Before Washing | Solvent After Each Washing Cycle | | | | |
|---|---|---|---|---|---|---|
|  |  | 1 | 2 | 3 | 4 | 5 |
| $P_2O_5$, % | 0.35 | 0.01 | 0.01 | 0.01 | 0.01 | 0.01 |
| $SiO_2$, ppm | 7100 | 173 | 270 | 177 | 430 | 267 |
| F, ppm | 526 | 2 | 2 | 2 | 2 | 1 |

This data shows an excellent removal of the silicon and fluorine containing impurities for each cycle using reformulated washing solution.

The aqueous phases and the solid phases, isolated from each of the corresponding washing cycles, weighed about 150 grams and 11.3–13.4 grams respectively, and analyzed for 2460–3540 ppm and 60,000–90,000 ppm respectively TOC. By material balance calculations it was found that about 2260–5790 ppm of organic impurities, expressed as TOC, were removed from the solvent into the aqueous and the solid phases.

EXAMPLE IV

The example demonstrates the importance of using a suitably formulated aqueous solution to wash the impure solvent.

A series of washing experiments were conducted using, in each experiment, 5 grams of a stripped tributylphosphate-keronse solvent and 2.5 grams of various aqueous sodium orthophosphate solutions. The washing was performed by shaking the mixture in a 10 ml test tube for one minute at room temperature. The resulting mixture was centrifuged at 3000 rpm for 5 minutes. The solvent was recovered and analyzed for $P_2O_5$, $SiO_2$ and fluorine. The conditions and results are as follows:

|  | Washing Solutions | | | | |
|---|---|---|---|---|---|
|  | A | B | C | D | E |
| $P_2O_5$, % | 5 | 5 | 5 | 3 | 4 |

-continued

| Na:P mole ratio | 2:1 | 2.5:1 | 3:1 | 3.5:1 | 3.5:1 |
|---|---|---|---|---|---|
| pH | 9.1 | 11.5 | 13.3 | 13.4 | 13.5 |

| | Solvent Before Washing | Solvent After Washing with the Indicated Washing Solutions | | | | |
|---|---|---|---|---|---|---|
| | | A | B | C | D | E |
| $P_2O_5$, % | 0.81 | 0.02 | 0.02 | 0.02 | 0.01 | 0.01 |
| $SiO_2$, ppm | 6000 | 4900 | 241 | 911 | 462 | 356 |
| F, ppm | 1051 | 194 | 206 | 72 | 58 | 4 |

All washing experiments produced solids which settled in the aqueous phase except the experiment using solution A, which had an Na:P mole ratio of 2:1 and a pH of 9.1. In that case, the solvent after washing contained 4900 ppm $SiO_2$ with a removal of only 18.3%.

EXAMPLE V

This example demonstrates the effect of temperature on the removal of $SiO_2$ from the solvent.

A series of washing experiments were conducted at various temperatures using about 80 grams of a stripped tributylphosphate-kerosene solvent and about 40 grams of an aqueous sodium orthophosphate solution containing 4% $P_2O_5$ and having an Na:P mole ratio of 3:1. The solvent and the aqueous solution were each heated to the desired temperature for each experiment before mixing. The washing was then conducted in a separatory funnel by shaking for about one minute. After centrifuging, the solvent was separated and analyzed. The results are as follows:

| | Solvent Before Washing | Solvent After Washing at Indicated Temperature | | |
|---|---|---|---|---|
| | | 25° C. | 34° C. | 57° C. |
| $P_2O_5$, % | 0.40 | 0.09 | 0.09 | 0.09 |
| $SiO_2$, ppm | 5900 | 315 | 97 | 119 |
| F, ppm | 529 | 4 | 1 | 2 |
| Solvent clarity | Slightly cloudy | Cloudy | Slightly cloudy | Clear |

With increasing wash temperature, the $SiO_2$ content of the washed solvent decreases and its clarity improves.

Each washing experiment resulted in about 40 grams of used aqueous solution and from 3.6 to 5.2 grams of solids. From the TOC found in the aqueous and in the solids, material balance calculations indicate that from 1700 ppm to 2500 ppm organic impurities as TOC were removed from the solvent during the various washing experiments.

EXAMPLE VI

A series of experiments similar to Example III were conducted except that 75% of the used aqueous washing solution was added directly to the tributylphosphate-kerosene solvent followed by the addition of a 25% caustic solution and water.

Initially, about 100 grams of an aqueous sodium orthophosphate solution containing 4 weight percent $P_2O_5$ and having a Na:P mole ratio of 3:1 and a pH of 13.4 were mixed with about 200 grams of a stripped tributylphosphate-kerosene solvent. The mixing was carried out in a beaker at 30°–37° C. using a magnetic stirrer. The pH of the solvent-aqueous mixture was 12 as measured with a glass electrode and a reference electrode. The reference electrode was separated from the solvent-aqueous mixture with a salt bridge made up of a sodium orthophosphate solution containing 2 weight percent $P_2O_5$ and having a Na:P mole ratio of 2.5:1. The resulting mixture was separated after centrifuging at 3000 rpm for 15 minutes. About 75 grams of the used washing solution was added to a new batch of 200 grams of tributylphosphate-kerosene solvent in a beaker. While mixing, 25% caustic solution was added to give a pH of 12 for the solvent-aqueous mixture. Water was added to bring the total aqueous phase (used washing solution plus NaOH plus water) to 100 grams. The water addition was found to produce no significant change in pH. This procedure was repeated 12 times.

Part of the washed solvent from cycle numbers 4, 8 and 12 was treated with activated carbon and filtered as described in Example I. The analytical data for the solvent are as follows:

| | Before Washing | Washed Solvent After Indicated Cycle | | |
|---|---|---|---|---|
| | | 4 | 8 | 12 |
| $P_2O_5$, % | 0.43 | 0.09 | 0.09 | 0.09 |
| $SiO_2$, ppm (without activated carbon treatment) | 3600 | 489 | 523 | 503 |
| $SiO_2$, ppm (with activated carbon treatment) | 3600 | 35 | 93 | 71 |
| F, ppm (without activated carbon treatment) | 695 | 33 | 12 | 41 |

The washing produced about 100 g of aqueous solution and 0.9 to 4.8 grams of solid for each analysis. Calculated organic impurity removal from the solvent was about 500 to about 1500 ppm as TOC.

EXAMPLE VII

This example demonstrates the regeneration of part of the solvent recycled for further extraction and stripping.

About 3 weight percent of a stripped solvent was removed continuously from a solvent extraction circuit. The collected solvent was regenerated batchwise about every twelve minutes. The solvent extraction circuit used a tributylphosphate-kerosene solvent on a pilot scale to purify phosphoric acid from a sodium carbonate treated wet process acid. The sodium carbonate pretreatment removed part of the fluorine compounds from the acid. The collected solvent from the first twelve hours of the extraction-stripping circuit was washed with a sodium orthophosphate aqueous solution containing about 4 weight percent $P_2O_5$ and having a Na:P mole ratio of about 3.5:1 at a solvent to aqueous ratio of 2:1. The washed solvent was separated, treated with activated carbon, and filtered. In subsequent batch regenerations, the collected solvent was washed with a mixture of 75–95 weight percent used aqueous washing solution, 50% caustic and water. During washing, the pH of the solvent-aqueous mixture was maintained at 11±1 and the solvent to aqueous ratio was about 2:1. After washing, the mixture was separated and the washed solvent was treated with activated carbon and filtered. After regeneration, the washed solvent was fed continuously back into the extraction-stripping circuit.

Two pilot solvent extraction experiments were carried out: one with the above described 3% solvent regeneration and another without the regeneration. In these two experiments, the solvents were repeatedly used for extraction and stripping about 200 times.

At the end of the experiments, the solvents from the stripping step were analyzed for silica and fluoride. The analytical results are as follows:

|  | Solvent with 3% Regeneration | Solvent without Regeneration |
|---|---|---|
| $SiO_2$, ppm | 1000 | 4500 |
| F, ppm | 400 | 500 |

These results show that the solvent with 3% regeneration contained a much lower level of silica than the solvent without regeneration. The results also show that the sodium carbonate pretreatment, which removed the bulk of the fluorine compounds from the feed acid, produced a low level of fluoride in the solvent without solvent regeneration. The combination of sodium carbonate pretreatment with solvent regeneration produced a still lower fluoride level in the solvent.

We claim:

1. In a process of washing a substantially water immiscible solvent with an aqueous solution to separate impurities from the solvent, the solvent being selected from the group consisting of alkyl phosphates, aryl phosphates and alkyl aryl phosphates, which solvent has been used to extract phosphoric acid from an impure phosphoric acid solution and from which the phosphoric acid has been stripped, the improvement which comprises conducting the washing with an aqueous alkali orthophosphate solution sufficient to maintain the pH of the solvent-aqueous mixture at from about 9.5 to about 12.5.

2. In a process of digesting phosphate rock with mineral acid to form an impure phosphoric acid solution, extracting phosphoric acid from the impure phosphoric acid solution using a substantially water immiscible solvent selected from the group consisting of alkyl phosphates, aryl phosphates and alkyl aryl phosphates, stripping the phophoric acid from the solvent, and washing the solvent with an aqueous solution to separate impurities from the solvent, the improvement which comprises conducting the washing with an aqueous alkali orthophosphate solution sufficient to maintain the pH of the solvent-aqueous mixture at from about 9.5 to about 12.5.

3. The process of claims 1 or 2 wherein the pH is from about 10 to about 12.

4. In a process of digesting phosphate rock with mineral acid to form an impure phosphoric acid solution, extracting phosphoric acid from the impure phosphoric acid solution using a substantially water immiscible solvent selected from the group consisting of alkyl phosphates, aryl phosphates and alkyl aryl phosphates, stripping the phosphoric acid from the solvent, and washing the solvent with an aqueous solution to separate impurities from the solvent, the improvement which comprises conducting the solvent wash with an aqueous alkali orthophosphate solution containing at least about 2 weight percent orthophosphate measured as $P_2O_5$, and having a mole ratio of alkali to phosphorus of from about 2.5:1 to about 3.5:1.

5. The process of claim 4 wherein the concentration requirements of the aqueous alkali orthophosphate solution are achieved by using an aqueous alkali orthophosphate solution having a pH of from about 11.5 to about 13.7 and a specific gravity of from about 1.07 to about 1.12 as measured at about 25° C.

6. In a process of digesting phosphate rock with mineral acid to form an impure phosphoric acid solution, extracting phosphoric acid from the impure phosphoric acid solution using a substantially water immiscible solvent selected from the group consisting of alkyl phosphates, aryl phosphates and alkyl aryl phosphates, stripping the phosphoric acid from the solvent, and washing the solvent with an aqueous solution to separate impurities from the solvent, the improvement which comprises conducting the solvent wash with an aqueous alkali orthophosphate solution containing from about 3 weight percent to about 4 weight percent orthophosphate measured as $P_2O_5$, and having a mole ratio of alkali to phosphorus of from about 2.7:1 to about 3.2:1.

7. The process of claim 6 wherein the concentration requirements of the aqueous alkali orthophosphate solution are achieved by using an aqueous alkali orthophosphate solution having a pH of from about 12 to about 13 and a specific gravity of from about 1.08 to about 1.11 as measured at about 25° C.

8. In a continuous process of producing phosphoric acid by digesting phosphate rock with mineral acid to form an impure phosphoric acid solution, extracting phosphoric acid from the impure phosphoric acid solution using a substantially water immiscible solvent selected from the group consisting of alkyl phosphates, aryl phosphates and alkyl aryl phosphates, stripping the phosphoric acid from solvent, and washing the solvent with an aqueous solution to separate impurities from the solvent, the improvement which comprises conducting the solvent wash with an aqueous alkali orthophosphate solution containing at least about 2 weight percent orthophosphate measured as $P_2O_5$ and having a mole ratio of alkali to phosphorus of from about 2.5:1 to about 3.5:1, separating the resulting aqueous, solvent, and precipitated solid phases, recycling the solvent phase to the extraction step, and recycling from about 75 to about 95 weight percent of the aqueous phase to the washing step.

9. The process of claim 8 wherein up to 95% of the stripped solvent is recycled directly to the extraction step and the remaining amount of the stripped solvent is washed and recycled.

10. The process of claim 9 wherein the solvent washing is conducted on a semi-continuous basis.

11. The process of claims 8, 9 or 10 further comprising the step of treating the washed solvent with activated carbon prior to recycling it to the extraction step.

12. In a continuous process of digesting phosphate rock with sulfuric acid to form an impure phosphoric acid solution, extracting the phosphoric acid from the impure phosphoric acid solution using a substantially water immiscible organic phosphate solvent selected from the group consisting of alkyl phosphates, aryl phosphates, and alkyl aryl phosphates mixed with a substantially water immiscible organic diluent, stripping the phosphoric acid from the solvent, and washing the solvent with an aqueous solution to separate impurities from the solvent, the improvement which comprises recycling to the extraction step up to about 95 weight percent of the solvent prior to the washing step, conducting the washing step on the remaining solvent with an aqueous alkali orthophosphate solution containing from about 3 to about 4 weight percent orthophosphate measured as $P_2O_5$ and having a mole ratio of alkali to phosphorus of from about 2.7:1 to about 3.2:1, centrifuging the resulting wash mixture to separate the resulting aqueous, solvent, and precipitated solid phases, treating the solvent phase with activated carbon, recycling the solvent phase to the extraction step, and recycling from about 75 to about 95 volume percent of the aqueous phase to the washing step.

13. The process of claim 12 wherein the organic phosphate solvent is tributylphosphate and the organic diluent is kerosene.

14. The process of claim 13 wherein the volume ratio of the solvent being washed to the aqueous alkali orthophosphate solution is from about 1:1 to about 4:1.

15. The process of claim 14 wherein the alkali is selected from the group consisting of sodium and potassium.

* * * * *

UNITED STATES PATENT AND TRADEMARK OFFICE
CERTIFICATE OF CORRECTION

PATENT NO. : 4,311,681
DATED : January 19, 1982
INVENTOR(S) : John S.C. Chiang et al It is certified that error appears in the above-identified patent and that said Letters Patent are hereby corrected as shown below:

Column 2, line 6, "proccesses" should read --processes--.
Column 4, line 33, "material" should read --materials--;
line 34, "be low" should read --be too low--. Column
5, line 42, "technnique" should read --technique--; line
66, "impurites" should read --impurities--. Column 8,
line 6, "Na-P" should read --Na:P--; line 57, "phosphate-keronse" should read --phosphate-kerosene--. Column
10, line 44, "minutes" should read --hours--.

Signed and Sealed this

Twenty-third Day of November 1982

|SEAL|

Attest:

Attesting Officer

GERALD J. MOSSINGHOFF

Commissioner of Patents and Trademarks